(12) United States Patent
Pfeifle et al.

(10) Patent No.: US 10,282,365 B2
(45) Date of Patent: May 7, 2019

(54) REDUCING CHANGES TO A COMPILED DATABASE

(71) Applicant: HERE Global B.V., Eindhoven (NL)

(72) Inventors: Martin Pfeifle, Seewald (DE); Boris Gumhold, Frankfurt (DE); Raimund Grün, Eschborn (DE); Peter Siniakov, Berlin (DE)

(73) Assignee: HERE Global B.V., Eindhoven (NL)

( * ) Notice: Subject to any disclaimer, the term of this patent is extended or adjusted under 35 U.S.C. 154(b) by 254 days.

(21) Appl. No.: 15/190,362

(22) Filed: Jun. 23, 2016

(65) Prior Publication Data

US 2017/0371945 A1     Dec. 28, 2017

(51) Int. Cl.
  *G06F 16/00*     (2019.01)
  *G06F 16/27*     (2019.01)
  *G06F 16/25*     (2019.01)

(52) U.S. Cl.
  CPC .......... *G06F 16/275* (2019.01); *G06F 16/258* (2019.01)

(58) Field of Classification Search
  None
  See application file for complete search history.

(56) References Cited

U.S. PATENT DOCUMENTS

| 6,532,304 B1 | 3/2003 | Liu et al. |
| 2006/0101450 A1 | 5/2006 | Datta et al. |
| 2009/0024656 A1 | 1/2009 | Wellman |
| 2014/0164415 A1 | 6/2014 | Duleba |

FOREIGN PATENT DOCUMENTS

| CN | 104182456 A | 12/2014 |
| WO | 2010/069380 A1 | 6/2010 |

OTHER PUBLICATIONS

Pfeifle, "Spatial Database Support for Virtual Engineering", Dissertation, 2004, pp. 366.
Shen, "Modeling of Change-only Information and Updating of Spatial Data", The International Archives of the Photogrammetry, Remote Sensing and Spatial Information Sciences, vol. XXXVII., Part B6b, 2008, pp. 217-224.

*Primary Examiner* — Bai D Vu
(74) *Attorney, Agent, or Firm* — Alston & Bird LLP

(57) ABSTRACT

It is disclosed to determine, in a second process of compiling data that yields a second compiled database, whether a first compiled database, which is yield from a first process of compiling data performed before the second process of compiling data, contains first object data defining a first object that is considered at least similar to a second object; and to include, in the second process of compiling data, second object data defining the second object into the second compiled database, if it is determined that first object data defining a first object that is considered at least similar to the second object is not contained in the first compiled database, and including the first object data defining the first object into the second compiled database otherwise. Further disclosed are corresponding apparatuses, a corresponding system and a corresponding computer program code.

19 Claims, 9 Drawing Sheets

Type: woodland
Name: unnamed

Type: woodland
Name: unnamed

Type: woodland
Name: unnamed

Type: woodland
Name: unnamed

Type: woodland
Name: unnamed

Type: woodland
Name: unnamed

Type: park
Name: unnamed

Type: woodland
Name: myWood

REDUCING CHANGES TO A COMPILED DATABASE

FIELD OF THE DISCLOSURE

The invention relates to the field of updating databases and more specifically to efficiently updating navigation databases that comprise different types of objects.

BACKGROUND

Efficiently updating navigation databases is critical to modern navigation systems that use these navigation databases. In order to allow efficient updating, it is beneficial to reduce the size of update data packages that represent incremental updates for these navigation databases.

SUMMARY OF SOME EXAMPLE EMBODIMENTS OF THE INVENTION

This may be achieved by keeping stable the order of the object data represented in the navigation databases to be updated and the updated navigation database. For instance, in the Navigation Data Standard (NDS) developed by the NDS Association, routing links are organized in lists in the navigation database. A link may be identified by its position in a list, and the relative positions of the links could be kept in the navigation databases. The position of at least a part of the links may then not be changed, which serves for reducing the size of the update data package. However, the increasing demand for bandwidth reduction requires further update data package size reduction.

It is thus, inter alia, an object of the present invention to allow for a further reduction of the size of update data packages for navigation databases.

According to a first exemplary aspect of the invention, a method is disclosed, the method comprising:
  determining, in a second process of compiling data that yields a second compiled database, whether a first compiled database, which is yield from a first process of compiling data performed before the second process of compiling data, contains first object data defining a first object that is considered at least similar to a second object; and
  including, in the second process of compiling data, second object data defining the second object into the second compiled database, if it is determined (by the determining) that first object data defining a first object that is considered at least similar to the second object is not contained in the first compiled database, and including the first object data defining the first object into the second compiled database otherwise.

This method may for instance be performed and/or controlled by one or more apparatuses, in particular by a server or a server cloud, or by a part of a server or server cloud.

According to a further exemplary aspect of the invention, a computer program code is disclosed, the computer program code when executed by a processor causing an apparatus to perform the actions of the method of the first aspect of the invention.

The computer program code may be stored on computer-readable storage medium. The computer readable storage medium could for example be a disk or a memory or the like. The computer program code could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to a further exemplary aspect of the invention, an apparatus is disclosed, which comprises means for performing the method according to the first aspect of the invention. The means of the apparatus can be implemented in hardware and/or software. They may comprise for instance at least one processor for executing computer program code for performing the required functions, at least one memory storing the computer program code, or both. Alternatively, they could comprise for instance circuitry that is designed to implement the required functions, for instance implemented in a chipset or a chip, like an integrated circuit. In general, the means may comprise for instance one or more processing means.

According to a further exemplary aspect of the invention, an apparatus is disclosed, which comprises at least one processor and at least one memory including computer program code, the at least one memory and the computer program code configured to, with the at least one processor, cause an apparatus at least to perform at least partially the method and/or the steps of the method according to the first aspect of the invention.

The disclosed apparatuses according to any aspect of the invention may be modules or components for a device, for example chips. Alternatively, the disclosed apparatuses according to any aspect of the invention may be devices, for instance servers or server clouds (e.g. a plurality of servers that jointly provide a service). The disclosed apparatuses according to any aspect of the invention may comprise only the disclosed components (e.g. means) or may further comprise one or more additional components.

According to a further exemplary aspect of the invention, a system is disclosed, comprising a first apparatus according to any previously described aspect of the invention and a second apparatus. The second apparatus comprises the first compiled database and is configured to update, based on data that is generated by a process based on the first compiled database and the second compiled database and allows updating the first compiled database to the second compiled database, the first compiled database to the second compiled database. The second apparatus may for instance be a navigation device, which may for instance be embodied as an electronic device. The second apparatus may for instance be a portable device or a device that is installed in a vehicle.

In the following, further exemplary features and embodiments of these aspects of the invention will be described.

The first and second process of compiling data may be performed by a compiler, which may for instance be or be part of an apparatus that performs and/or controls the method according to the first aspect of the invention. The process of compiling data may be a process, in which data, e.g. of a raw database (e.g. a first and second raw database for the first and second processes of compiling data, respectively), is transformed into a binary representation, e.g. from a textual representation. The data input in the process may be available e.g. as extensible-markup-language-files (XML-files), or in relational tables. A binary representation, which may for instance be more compact than the original (e.g. textual) representation, allows for using the data e.g. in an embedded environment with strict resource requirements, in particular memory limitations. A navigation database may for instance be a compiled database.

The raw database may for instance be a database with data in the form of e.g. relational tables. The data may for instance be object data. The raw database may for instance be an Oracle Database. The first and second compiled databases may be databases with data in the form of e.g. binary encoded files.

Object data may for instance respectively define an object, e.g. geometrically and/or otherwise, in particular a map-related object, e.g. area, river, border, road, labelling hint, 3D surface, 3D landmark, satellite or junction image, etc. At least a part of the object data may for instance define the (geometric) representation of the object, e.g. a polygon, line, chain of lines and/or digital terrain tile. Other parts of the object may for instance define features and/or attributes of the object.

Determining whether the first compiled database contains first object data defining a first object that is considered (e.g. by an apparatus, e.g. according to one or more pre-defined criteria) at least similar (which comprises the case of the first object being equal to the second object) to a second object may for instance comprise searching the first compiled database for such first object data, or searching a first raw database (e.g. based on which the first compiled database was generated) for data (e.g. raw object data) allowing to conclude that the first compiled database contains first object data defining a first object that is considered at least similar to a second object.

This determining may for instance be performed prior to or during the second process of compiling data, for instance by the same apparatus that performs the second process of compiling data, or by another apparatus.

Including the second object data or the first object data into the second compiled database may comprise compiling respective data to obtain the second object data or the first object data.

Second object data is thus advantageously only included into the second compiled database if it is considered that the first compiled database does not contain first object data that is at least similar to this second object data. Otherwise, the first object data is included into the second compiled database. Thus only (second) object data representing information that is considered e.g. significantly different from information already represented by the first compiled database is included into the second compiled database, which allows for avoiding introducing insignificant changes into the second compiled database and thus allows to keep the second compiled database similar to the first compiled database. This may for instance be exploited in a process of generating update packages that reflect differences between the first compiled database and the second database, in particular by allowing such update packages to become small in size.

According to an exemplary embodiment of all aspects of the invention, the first compiled database and the second compiled database serve as inputs to a process of generating data that allows updating the first compiled database to the second compiled database.

The data (e.g. a patch) may for instance be based on a difference between the second compiled database and the first compiled database. In a scenario where the first object defined by the first object data is considered similar to the second object defined by the second object data, including the first object data instead of the second object data into the second compiled database has the advantage that the data (e.g. an update patch or update data package) allowing updating the first compiled database will be smaller as compared to a case where the second object data is included into the second compiled database. The reduced size of the data requires e.g. less bandwidth and/or time for transmission of this data to a device on which the first compiled database is already available and shall be updated by the data, with e.g. only minor or without any deviation in accuracy.

The generating of the data that allows updating the first compiled database to the second compiled database may for instance be comprised by the method according to the first aspect of the invention.

The method according to the first aspect of the invention may further comprise providing (e.g. transmitting, e.g. via a wireless or wire-bound communications channel) a representation of the data that allows updating the first compiled database to the second compiled database to another apparatus. The other apparatus may for instance be an apparatus on which the first database is already stored, and which is configured to update the first compiled database to the second database based on the data allowing updating the first compiled database to the second compiled database. On the other apparatus, an application may for instance be installed that is configured to use the first compiled database and/or the second compiled database.

According to an exemplary embodiment of all aspects of the invention, the determining is based on a set of one or more rules respectively defining in which case an object is to be considered at least similar to another object or not.

One or more rules of the set of rules may for instance be pre-defined rules. A rule of the set of rules may for instance define that an object is to be considered at least similar to another object if object data defining the object is equal to object data defining the other object.

A rule of the set of rules may for instance define that an object is to be considered at least similar to another object if a similarity measure that expresses a similarity between the object and the other object is in a pre-defined relation to a pre-defined threshold. This allows for pre-defining application- and/or object-specific similarity measures.

The similarity measure may be object-specific. Respectively different similarity measures may be used for respectively different types or categories of objects. Non-limiting examples of types or categories of objects are areas (with e.g. polygons as geometric representations), boarders, roads or rivers (with e.g. lines or chain of lines as geometric representations), labels (with e.g. labelling hints as geometric representations), or a 3D surface (with e.g. digital terrain tiles as geometric representations). Other categories or types of objects may be defined and geometrically represented appropriately. The pre-defined relation may for instance be e.g. "larger than", "larger-or-equal", "smaller than", or "smaller-or-equal".

The pre-defined threshold may for instance depend on an application for which a database corresponding to the second compiled database is intended. The application may for instance be used on a device on which the first compiled database is already installed (and on which the second compiled database shall e.g. be used). Different applications may thus for instance require different accuracies of the second compiled database, so that it is advantageously to trade the accuracy of the second compiled database against the size of the update package that is required to update the first compiled database to the second compiled database. For instance, in case of a high accuracy required by an application on the device, the pre-defined threshold may be defined in a way that already a small difference between the first and second object data leads to the second object data rather than the first object data to be included into the second compiled database, whereas in case of a low accuracy required by the application, the pre-defined threshold may be defined in a way that the small difference between the first and second object data leads to the first object data to be included in the second compiled database.

The similarity measure may for instance depend on a difference between the object and the other object with respect to at least one characteristic of respective geometric representations of the object and the other object or with respect to the respective geometric representations themselves, and/or a difference between the object and the other object with respect to at least one attribute of the object and the other object. This allows for considering an only slight difference with respect to the respective geometric representation of an object, e.g. deviation of a river due to erosion, differently than a difference in an attribute, e.g. renaming of a river.

The difference between the object and the other object may for instance have a value different than zero, but may also be zero. Geometric representations may for instance be determined by at least a part of the object data. Attributes may for instance be part of the object data. The at least one attribute may for instance not pertain to a position, shape, order of shape-determining elements, number of shape-determining elements, scale and orientation of the respective geometric representations of the objects. The at least one attribute may for instance comprise a type and/or a name. The type may for instance be a type or a category of an object. The name may for instance be the name of an object.

The at least one characteristic may comprise position, shape, order of shape-determining elements, number of shape-determining elements, scale and/or orientation, to name but a few non-limiting examples.

Shape-determining elements may for instance be points or vertices defining a geometric representation, e.g. a polygon, a line, a chain of lines, a labelling hint or a digital terrain tile.

In the case of the object being an area, an example geometric representation is a polygon. Characteristics of the polygon may be the position, order and/or number of shape-determining elements (e.g. corners or other points defining a polygon), shape, scale and/or orientation. Example differences between the area and another area are the maximum distance between the shape-determining elements of the polygons representing the areas, differences between the maximum distances between the polygons representing the areas, and/or differences of the size of the areas defined by the polygons.

In the case of the object being a river, a border or a road, an example geometric representation is a line or a chain of lines. Characteristics of the line or the chain of lines may be a position, order and/or number of shape-determining elements and/or an orientation. Example differences between such objects and another such object are the maximum distance between the shape-determining elements and/or differences between the maximum distances the area enclosed by the lines or chains of lines.

In the case of the object being a label, an example geometric representation is a labelling hint. An example attribute is a name. A characteristic of a labelling hint may be a position. Example differences between the label and another label are a maximum distance between the positions and/or a difference of the name.

In the case of the object being a 3D surface, an example geometric representation is a digital terrain tile. Characteristics of a digital terrain tile may be position and height values, which may for instance be in the form of position and height value triplets, e.g. (x, y, z), with a latitude (x), a longitude (y) and an altitude (z). Example differences between the 3D surface and another 3D surface are the difference between the respective value triplets.

For each of the types or categories of objects mentioned above, but equally well also for other types or categories of objects, other geometric representations with according characteristics, attributes and measures for determining the difference of the characteristics of the geometric representation and/or attributes between a first and a second object, for instance similarity measures, may be defined, as well.

The similarity measure of two objects that differ only in the order and/or the number of shape-determining elements of their respective geometric representations may for instance equal the similarity measure of two objects that do not differ in this respect.

The similarity measure of two objects that differ with respect to a position, shape, scale and/or orientation may for instance differ from the similarity measure of two objects that do not differ in this respect.

The similarity measure may for instance be set to a pre-defined (e.g. extremal) value if there exists a difference between the object and the other object with respect to at least one attribute of a set of one or more pre-defined attributes, and the similarity measure may be represented by a difference between the object and the other object with respect to at least one characteristic of respective geometric representations of the object and the other object, if there exists no difference between the object and the other object with respect to all attributes of the set of pre-defined attributes. The set of pre-defined attributes may for instance comprise a type and/or a name.

A similarity measure may thus advantageously be used for considering, whether a first object is at least similar to a second object or not. For instance, a high value of a similarity measure may indicate a lower similarity of the objects, whereas a low value of the similarity measure may indicate a high similarity of the objects. Alternatively, the similarity measure may be defined vice versa.

A rule of the set of rules may for instance define that an object is to be considered at least similar to another object, although the object and the other object differ in at least one aspect of their respective geometric representations, in particular in an order and/or a number of shape-determining points, if at least a position, shape, scale and orientation of their respective geometric representations match (e.g. are equal).

A rule of the set of rules may for instance define that an object is to be considered at least similar to another object although the object and the other object differ in at least one aspect of their respective geometric representations, if a measure for the difference between these geometric representations is below a pre-defined threshold. The pre-defined threshold may for instance depend on an application (e.g. on a type thereof) for which a database corresponding to the second compiled database is intended. The application-dependent database may for instance be obtained by applying an update to the first compiled database.

Exemplarily, a measure for the difference may be a similarity measure as described above.

A rule of the set of rules may for instance define that an object is not to be considered at least similar to another object if a geometric representation of the object differs from a geometric representation of the other object by scaling, rotation and/or translation.

This rule may for instance outrank the rule, which defines that an object is to be considered at least similar to another object although the object and the other object differ in at least one aspect of their respective geometric representations, if a measure for the difference between these geometric representations is below a pre-defined threshold. Thus for instance any respective difference in scale, orientation and/or position may lead to an object being not considered at least similar to another object.

A rule of the set of rules may for instance define that an object is not to be considered at least similar to another object if the object and the other object differ with respect to at least one pre-defined attribute, in particular a type or name.

This rule may for instance outrank the rule, which defines that an object is to be considered at least similar to another object although the object and the other object differ in at least one aspect of their respective geometric representations, if a measure for the difference between these geometric representations is below a pre-defined threshold, and/or the rule, which defines that an object is not to be considered at least similar to another object if a geometric representation of the object differs from a geometric representation of the other object by scaling, rotation and/or translation. Thus for instance any difference in the respective name and/or type may lead to an object being not considered at least similar to another object.

A rule of the set of rules may for instance define that an object is not to be considered at least similar to another object although their respective geometric representations or at least a position, shape, scale and orientation of their respective geometric representations match, if the object and the other object differ at least with respect to at least one pre-defined attribute. The pre-defined attribute may for instance be a type or a name.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

The following description serves to deepen the understanding of the present invention and shall be understood to complement and be read together with the description of example embodiments of the invention as provided in the above SUMMARY section of this specification.

Incremental map updates are crucial for modern navigation systems. It is especially important that the size of the update data package is as small as possible to reduce bandwidth in the transmission of the update data package. Already some work has been done to generate small update data packages. For instance, small update data packages can be created based on algorithms that compare first and second compiled databases (e.g. a navigation database to be updated and an updated navigation database) to each other and try to encode the detected changes in a size-efficient way. Thus, the optimization takes place after the second raw database is compiled.

In addition, the compiler may be optimized so that it generates a second compiled database, which is as similar as possible to the first compiled database, e.g. by introducing algorithms, which keep the identifiers (IDs) of traffic patterns (e.g. of links) as similar as possible to the first compiled database.

Furthermore, the compiler should not introduce differences, which are not reflected by reality, i.e. which are of no or only insignificant use to the end user. An example of unnecessary deviation between the result of the first compilation and the second compilation is e.g. the case that the difference between the first and the second compiled database lies in the encoding of the order of the shape-determining elements (e.g. the corners) of a polygon, without any change of the polygon geometry. Such a difference of the shape-determining elements might result from an unnecessary change in the second raw database and would unnecessarily add to the update data package size after the second compiled database would have been compiled.

Two areas may be considered important for creating small update packages. Firstly, during compilation of the second compiled database, the first raw and compiled databases should be taken into consideration, in order to avoid unnecessary deviations between the first and the second compiled databases. The more similar the first and the second compiled databases are, the easier it is for an update data package algorithm to create a small update data package. Secondly, the update data package algorithm should try to express the differences between the first and the second compiled databases with as few bytes as possible.

Figure 1:
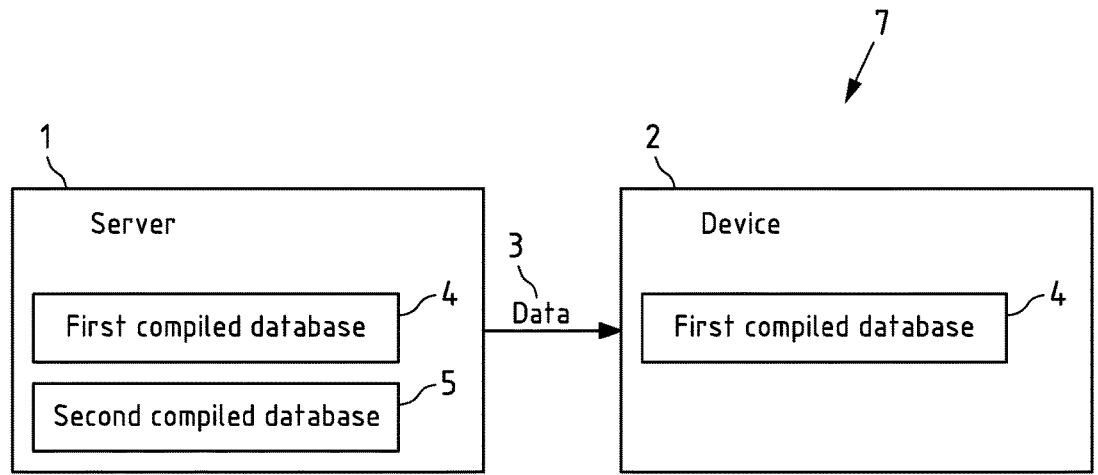
FIG. 1 a schematic block diagram of a system according to an example embodiment of the present invention.

FIG. 1 is a schematic block diagram of a system 7 according to an example embodiment of the present invention. System 7 exemplarily comprises a server 1 and a device 2. In the example embodiment of FIG. 1, a first compiled database 4 is comprised by both server 1 and device 2, and a second compiled database 5 is comprised by server 1.

For instance, device 2 is or forms a part (e.g. as a module) of a navigation device, in particular a Portable Navigation Device (PND), a smartphone, a tablet computer, a notebook computer, a navigation watch, or a navigation device that is fixedly installed in a vehicle, e.g. in the form of an in-dash device. Both server 1 and device 2 may each comprise one or more compiled databases (e.g. respectively pertaining to different geographical regions)

Server 1 may be a server for compiling databases (e.g. raw databases) and storing databases, e.g. raw databases and/or compiled databases. For instance, server 1 is a single apparatus, but server 1 may equally well represent several apparatuses (e.g. a server cloud).

In a compiled database, e.g. in a navigation database according to the NDS, routing links organized in lists are stored. In a corresponding raw database, the links may have permanent LinkIDs.

Server 1 is exemplarily configured to perform the method according to the first aspect of the invention.

Data 3 may be generated by server 1 and transmitted to device 2. Data 3 may comprises data for updating the first compiled database 4 to a second compiled database 5.

In the process of compiling data of a second raw database, information (e.g. the result) of a previous process of compiling data of a first raw database may be used as input. A compiler of server 1 may for instance keep the order of the object data represented in the first and second compiled databases stable. For instance, in NDS, routing links are organized in lists in the navigation database. A link may be identified by its position in a list. In the raw database, the links may have permanent LinkIDs. For instance, the relative positions of the links are kept in the compiled databases by the compiler.

For example, between a first and a second raw database, the link with the permanent LinkID 444777 is split into two links with LinkIDs 4447771 and 4447772. Such link splits may occur, e.g. if a speed limit was introduced. The compiler may read the position of the link in the first raw database, try to substitute the link 444777 with the link 4447771 and store the link 4447772 at the end of the list. Thus, the position of at least a part of the links is not changed, which already serves for reducing the size of the update data package.

According to example embodiments of the present invention, the compiler of server 1 may additionally or alternatively decide not to reflect changes of a link of the raw database in the compiled database, if these changes are considered insignificant, as will be described in more detail below.

Figure 2:
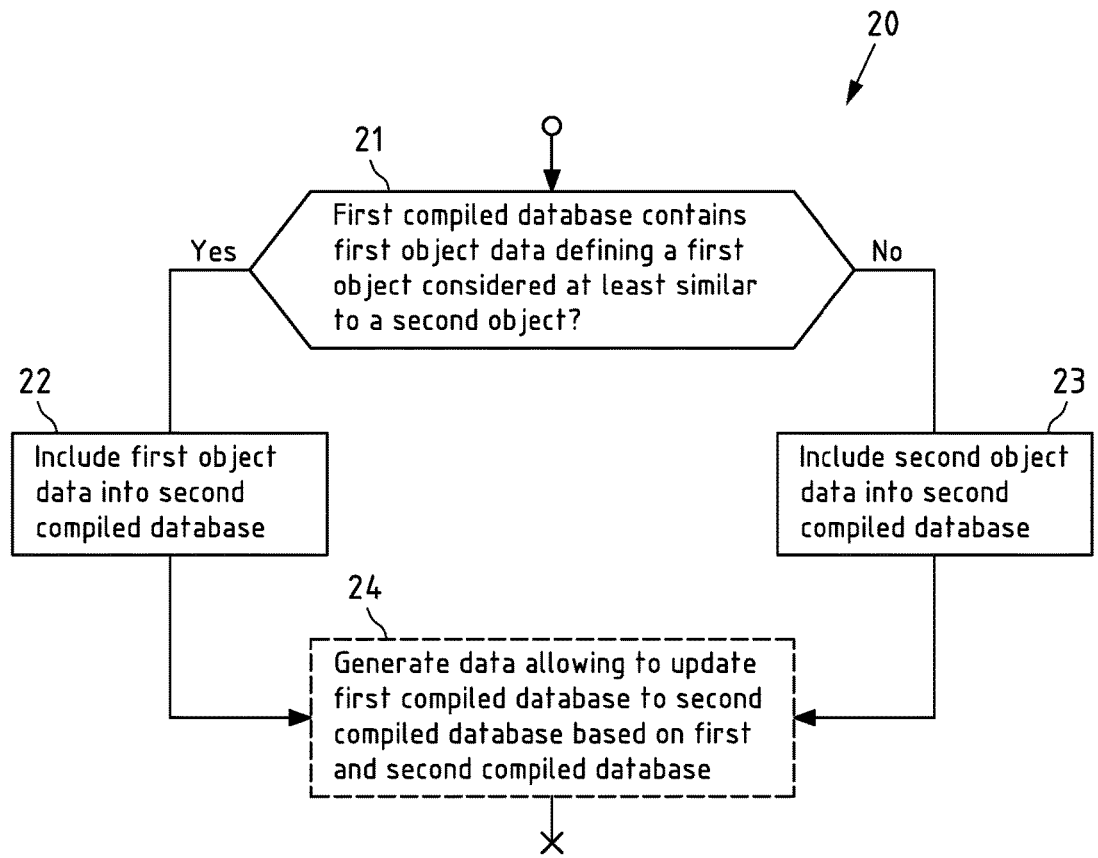
FIG. 2 a flowchart showing an example embodiment of a method according to the present invention.

FIG. 2 is a flowchart 20 of an example embodiment of a method according to the first aspect of the invention. The actions of this flowchart 20 may for instance be performed by server 1 of FIG. 1 or by a part thereof. The method of flowchart 20 may be performed in a process of compiling data of a second raw database yielding a second compiled database (e.g. second compiled database 5 of FIG. 1, which may for instance be an updated navigation database).

In a step 21 of flowchart 20, it is determined, in a second process of compiling data that yields a second compiled database, whether a first compiled database (e.g. first compiled database 4 of FIG. 1, which may for instance be a navigation database to be updated), which is yield from a first process of compiling data performed before the second process of compiling data, contains first object data defining a first object that is considered at least similar to a second object.

If it is determined in step 21, that the first compiled database contains first object data defining a first object that is considered at least similar to a second object, step 22 is performed. In step 22, first object data defining the first object is included into the second compiled database.

If it is determined in step 21, that the first compiled database does not contain first object data defining a first object that is considered at least similar to a second object, step 23 is performed. In step 23, second object data defining the second object is included into the second compiled database.

The second compiled database could then for instance be used, as shown in optional step 24 of flowchart 20, together with the first compiled database, to generate data allowing for updating the first compiled database to the second compiled database. This data may for instance be provided to a device that stores the first compiled database to allow this device to update the first compiled database to the second compiled database. Flowchart 20 may then for instance further comprise a step of outputting (e.g. transmitting) the data generated in step 24, e.g. towards the device that stores the first compiled database.

For considering, whether a first object is at least similar to a second object, the difference between the geometric representations of the first and second objects, i.e. the difference of characteristics and/or attributes, may for instance be determined by defining possible measures for determining the difference of the characteristics of the geometric representation and/or attributes between a first and a second object.

Pre-defined thresholds may for instance be defined for the measures. For a measure being smaller than the pre-defined threshold, first object data may for instance be included in the second process of compiling data (rather than second object data), whereas for a measure being larger than the pre-defined threshold, second object data may for instance be included in the second process of compiling data (rather than first object data). Alternatively, for a measure being smaller than the pre-defined threshold, second object data could be included in the second process of compiling data (rather than first object data), whereas for a measure being larger than the pre-defined threshold, first object data could be included in the second process of compiling data (rather than second object data).

When first object data is included in the second compiled database, it could exemplarily be always the first object data defining the first object, which is most similar to the second object.

Determining, if an object of a first database, e.g. a first raw database, (first object) is at least similar to an object of a second database (second object), may for instance be performed for every object of the second database, e.g. a second raw database. Alternatively, determining, if a first object is at least similar to a second object, may for instance be performed not for every object.

The difference of the characteristics and/or attributes between a first object o and a second object o' may be exemplarily defined by a similarity measure similarity (o, o'), wherein $$\text{similarity}(o,o')=\infty,$$

if any attribute has different values for o and o', and, if all attributes have the respectively same values for o and o', may be exemplarily defined as:

$$\text{similarity}(o,o')=\text{area difference}(\text{geometric representation of } o, \text{geometric representation of } o')(\text{e.g. in the case of areas), and/or}$$

$$\text{similarity}(o,o')=\text{maximum distance}(\text{geometric representation of } o, \text{geometric representation of } o') \text{ (e.g. in the case of lines), and/or}$$

$$\text{similarity}(o,o')=\text{Euclidean distance}(\text{geometric representation of } o, \text{geometric representation of } o') \text{ (e.g. in the case of labels).}$$

The area difference (geometric representation of o, geometric representation of o') may for instance be the difference of the size of the areas defined by the geometric representations of o and o'. For instance, if a second area is 110% the size of a first area, the area difference may amount to 10% the size of the first area. Alternatively, the area difference may not only pertain to the size of the areas, but also to the position of the areas, so that e.g. their overlap or non-overlap is considered. The area difference of two areas A and B may for instance be defined as the symmetric difference $\{x|(x\in A \wedge x\notin B) \vee (x\in B \wedge x\notin A)\}$. The area difference (geometric representation of o, geometric representation of o') may for instance be the symmetric area difference between the geometric representations of o and o', as defined in chapter 8.3.1 of the PHD thesis "Spatial Database Support for Virtual Engineering" by M. Pfeifle, University of Munich (2004), available for download at https://edo-c.ub.uni-muenchen.de/2701/1/Martin_Pfeifle.pdf.

Figure 4:
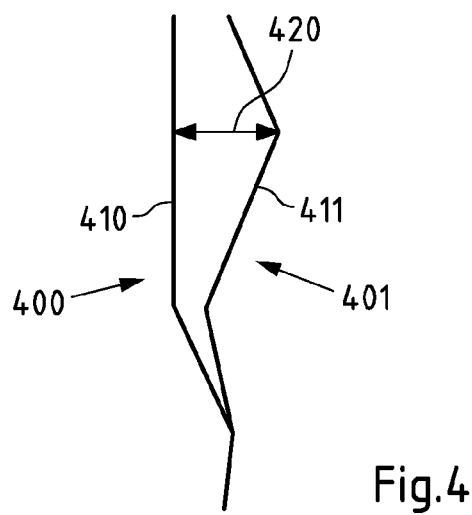
FIG. 4 examples of objects (here: rivers), object data, and characteristics thereof according to example embodiments of the present invention.

When regarding geometric representations of objects o and o' comprising multiple points (e.g. points of a line), the maximum distance (geometric representation of o, geometric representation of o') may for instance be equal to the maximal value of dist(P) for all (e.g. shape-determining) points P of object o and of object o', wherein dist(P) is equal to the minimum distance of a point P of one of the objects to the piecewise connected representation of the points of the other object (cf. distance 420 between object 400 and 401 in FIG. 4). The maximum distance can be zero if object o' was created out of object o by introducing in each line between the points of object o additional points. The geometry doesn't change but the number of points is duplicated. These two objects should be regarded as similar.

The Euclidean distance (geometric representation of o, geometric representation of o') may for instance be the Euclidean distance between the geometric representation of object o and the geometric representation of object o'.

In further exemplary embodiments, whether or not a first object is considered at least similar to a second object may depend on the use case, which the second compiled database has to support. A change of an object might e.g. be irrelevant for a navigation system in a car, but might e.g. be relevant for applications supporting rangers or woodmen. A more accurate geometry may be less important than the size of the update package, which may for instance be the case for updates occurring frequently, for instance on a weekly or monthly basis (e.g. updates for a navigation system in a car), or vice versa, which may for instance be the case for updates occurring rarely, for instance on a yearly basis (e.g. updates for applications supporting rangers or woodmen).

FIGS. 3a-3h show examples of objects according to example embodiments of the present invention. In the following examples of FIGS. 3b-3h, exemplary objects (second objects) are compared to the object shown in FIG. 3a (first object) and are considered at least similar to this object or not. Examples are given of how to consider similarity between a first and a second object according to example embodiments of the present invention. To this end, FIGS. 3a-3h exemplarily show areas as objects, polygons as according geometric representations, shape-determining elements (e.g. polygon vertices) as characteristics of the geometric representations and types and names as attributes.

Figure 3A:
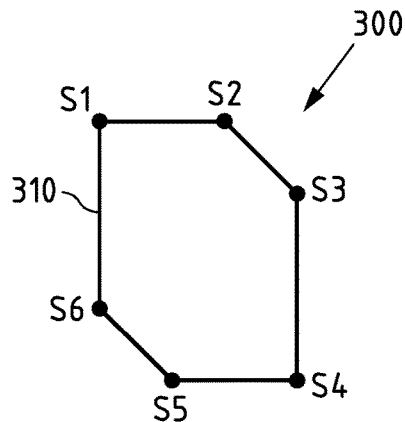
FIGS. 3a-3h examples of objects (here: areas), object data, characteristics and/or attributes thereof according to example embodiments of the present invention.

In FIG. 3a, the (first) object is an area 300, which is geometrically represented by a polygon 310. Shape-determining elements S1-S6 serve as characteristics of the geometric representation, i.e. the polygon 310. The type and name of the area are "woodland" and "unnamed", respectively.

Figure 3B:
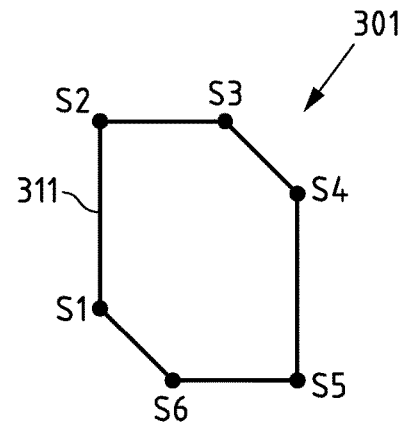

In FIG. 3b, the (second, slightly changed) object is an area 301, which is geometrically represented by a polygon 311. Shape-determining elements S1-S6 serve as characteristics of the geometric representation. The type and name of the area are "woodland" and "unnamed", respectively. Area 301 differs from area 300 of FIG. 3a in the enumeration order of the shape-determining elements S1-S6 of the polygon 311 compared to the enumeration order of the shape-determining elements S1-S6 of the polygon 310. A difference in the enumeration order of the shape-determining elements may for instance occur in a second raw database in comparison to a first raw database. In the example of FIG. 3b, since the geometry of polygon 311 is equal to the geometry of polygon 310, area 301 is considered at least similar (here: equal) to area 300 of FIG. 3a.

Figure 3C:
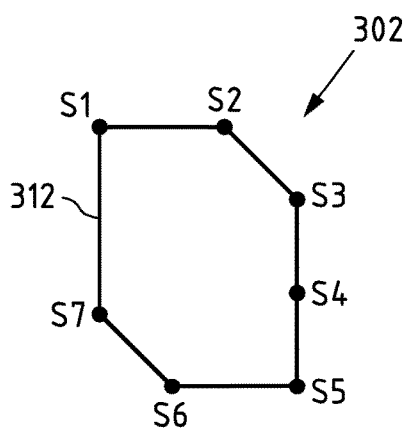

In FIG. 3c, similar to FIG. 3b, the geometry of polygon 312 as geometric representation of area 302 (second object) is equal to the geometry of polygon 310, although the area 302 differs from area 300 of FIG. 3a in that polygon 312 defining area 302 comprises seven shape-determining elements S1-S7 as characteristics of the geometric representation instead of six shape-determining elements S1-S6 of polygon 310 defining area 300. The type and name of area 302 are "woodland" and "unnamed", respectively. In the example of FIG. 3c, similar to the example of FIG. 3b, since the geometry of polygon 312 is equal to the geometry of polygon 310, area 302 is considered at least similar (here: equal) to area 300 of FIG. 3a.

A possible measure for the difference of the characteristics of the geometric representation is the difference of the area defined by the shape-determining elements S1-S6 of polygon 311 and by the shape-determining elements S1-S7 of polygon 312, respectively, to the area defined by the shape-determining elements S1-S6 of polygon 310. In the examples of FIGS. 3b-3c, the difference of the measure of the characteristics of the geometric representation is zero, thus although the enumeration order of the shape-determining elements and/or the number of shape-determining elements, respectively, is different, the areas 301 and 300, as well as the areas 302 and 300, are considered at least similar. For instance, the according similarity measures similarity (area 300, area 301) and similarity (area 300, area 302), respectively, may be 0. Further measures for determining differences of the characteristics of the geometric representation are also possible in order to consider, if the areas 301 and 300 are at least similar. Therefore, in the second process of compiling data, it is considered that the first object (area 300) is at least similar to the second object (area 301 and area 302, respectively), and thus the first object data (rather than the second object data) is included into the second compiled database.

For instance, if the enumeration order of shape-determining elements in the second raw database is different to the enumeration order in the first raw database, the compiler should detect that the first and second objects are similar (or identical) to each other and should not reorder the shape-determining elements according to the enumeration order of the second raw database in the second process of compiling data, but keep the enumeration order of the first raw database. For instance, if, as a sole difference between two polygons, a straight line between shape-determining elements S4 and S5 is provided with another shape-determining element S4a without any geometric change the polygon, the compiler should detect the similarity of the polygons and should use the object data of the first raw database instead of the object data of the second raw database in the second process of compiling data.

Figure 3D:
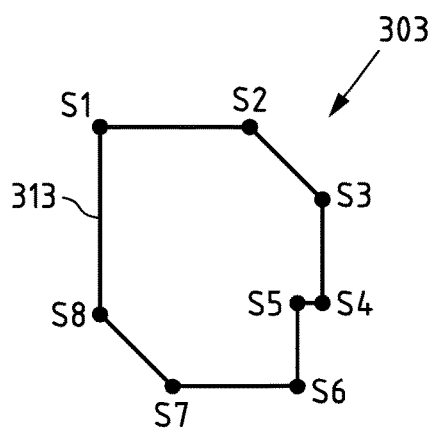

In FIG. 3d, the (second) object is an area 303, which is geometrically represented by a polygon 313. Shape-determining elements S1-S8 serve as characteristics of the geometric representation. The type and name of the area are "woodland" and "unnamed", respectively. Area 303 differs from area 300 (first object) of FIG. 3a in the geometry (here: shape and size) of polygon 313 compared to polygon 310. It may for instance depend on the use case of the second compiled database whether polygon 313 is considered at least similar to polygon 310 or not.

Figure 3E:
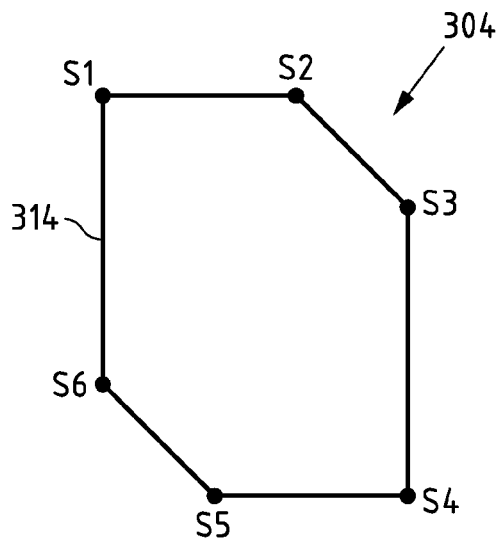

In FIG. 3e, similar to FIG. 3d, the geometry of polygon 314 as geometric representation of area 304 (second object) is different (here: scaled) to the geometry of polygon 310 representing area 300 of FIG. 3a, since the area defined by the shape-determining elements S1-S6 of polygon 314 compared to the area defined by the shape-determining elements S1-S6 of polygon 310 differs. The type and name of area 304 are "woodland" and "unnamed", respectively. Geometric representations, which are scaled, may for instance be regarded as dissimilar. In the example of FIG. 3e, similar to the example of FIG. 3d, since the geometry of polygon 312 is equal to the geometry of polygon 310, area 302 is considered at least similar (here: equal) to area 300 of FIG. 3a. It may for instance depend on the use case of the second compiled database whether polygon 314 is considered at least similar to polygon 310 or not.

Considering, in the examples of FIGS. 3d-3e, the difference of the areas defined by the shape-determining elements S1-S8 of polygon 313 and the difference of the area defined by the shape-determining elements S1-S6 of polygon 314, respectively, compared to the area defined by the shape-determining elements S1-S6 of polygon 310 as a possible measure for the difference of the characteristics of the geometric representation, the measure may for instance be below or above a pre-defined threshold, that is e.g. specific for the use case of the second compiled database. In the examples of FIGS. 3d-3e, the measure for the difference of the characteristics of the geometric representation is different from zero. For instance, the according similarity measure similarity (area 300, area 303) and similarity (area 300, area 304) may be calculated as a relative measure, e.g. as the ratio between the difference of the size of area 303 and area 304, and the size of area 300. In the example of FIG. 3d, similarity (area 300, area 303) may for instance be 0.1, in the example of FIG. 3e, similarity (area 300, area 304) may for instance be 3.

In the second process of compiling data, if it is determined that the measure, e.g. similarity (area 300, area 303)=0.1 and/or similarity (area 300, area 304)=3, is above a pre-defined threshold, which is for instance a certain ratio, e.g. 1 or 5, it is considered that the first object (area 300) is not similar to the second object (area 303 and area 304, respectively), and the second object data (rather than the first object data) is included into the second compiled database. If, in the second process of compiling data, it is determined that the measure is below the pre-defined threshold, it is considered that the first object is at least similar to the second object, and the first object data (rather than the second object data) is included into the second compiled database.

For instance, an application-specific compiler may for instance decide whether the object data of the first raw database or object data of the second raw database is used in the second process of compiling data, e.g. by deciding whether a more accurate geometry is more important (e.g. with respect to an application that shall use the second compiled database) than an increased update package size.

Figure 3F:
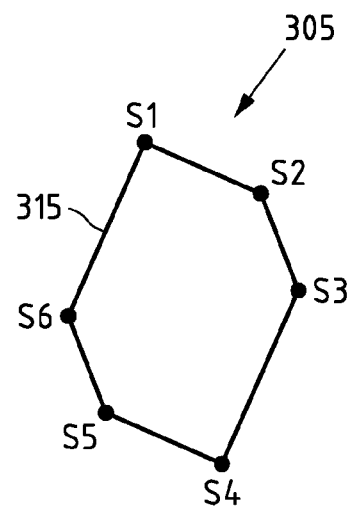

In FIG. 3f, the (second) object is an area 305, which is geometrically represented by a polygon 315. Again, shape-determining elements S1-S6 serve as characteristics of the geometric representation. The type and name of the area are "woodland" and "unnamed", respectively. Area 305 differs from area 300 of FIG. 3a in the geometry (here: orientation—rotation and/or translation) of polygon 315 compared to polygon 310. For instance, geometric representations, which are rotated and/or a translated may always be regarded as dissimilar. It may for instance depend on the use case of the second compiled database, whether polygon 315 is considered at least similar to polygon 310 or not.

Considering, in the example of FIG. 3f, a degree of rotation and/or a distance of translation of the area defined by the shape-determining elements S1-S6 of polygon 315 compared to the area defined by the shape-determining elements S1-S6 of polygon 310 as a possible measure for the difference of the characteristics of the geometric representation, the measure may for instance be below or above a pre-defined threshold, that is e.g. specific for the use case. In the example of FIG. 3e, the area defined by the shape-determining elements S1-S6 of polygon 315 is rotated compared to the area defined by the shape-determining elements S1-S6 of polygon 310, thus the measure of the difference of the characteristics of the geometric representation is different from zero. For instance, the according similarity measure similarity (area 300, area 305) may be calculated as the rotation angle, and, in the example of FIG. 3f, may for instance be 30°.

In the second process of compiling data, if it is determined that the measure, e.g. similarity (area 300, area 305)=30°, is above a pre-defined threshold, which is for instance a certain ratio, e.g. 5° or 10°, it is considered that the first object is not similar to the second object, and the second object data (rather than the first object data) is included into the second compiled database. If, in the second process of compiling data, it is determined that the measure is below the pre-defined threshold, it is considered that that the first object is at least similar to the second object, and the first object data (rather than the second object data) is included into the second compiled database.

Figure 3G:
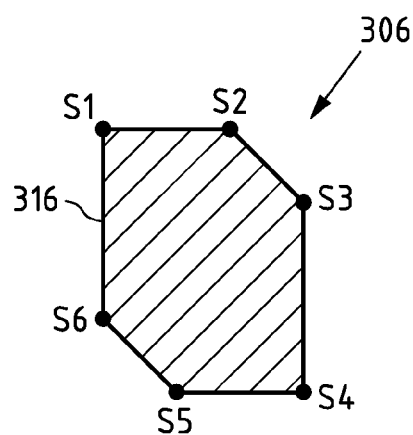

In FIG. 3g, the (second) object is an area 306, which is geometrically represented by a polygon 316. Again, shape-determining elements S1-S6 serve as characteristics of the geometric representation. The type and name of the area are "park" and "unnamed", respectively. Area 306 differs from area 300 of FIG. 3a in the type of area 306 compared to the type of area 300.

Figure 3H:
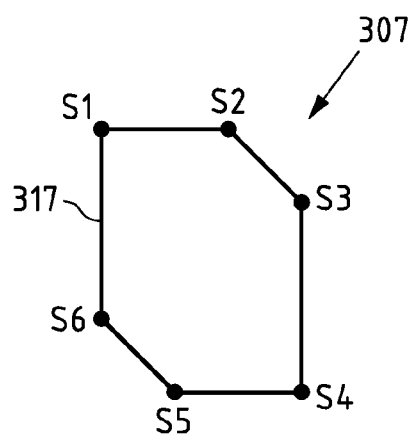

In FIG. 3h, the name of area 307 (second object) differs from area 300 of FIG. 3a, whereas the type and the characteristics of the geometric representation (polygon 317) are equal to type and characteristics of the geometric representation (polygon 310) of area 300.

A difference of the type or the name, between a first object and a second object may for instance mark a difference in an attribute. A difference in an attribute between a first and a second object may for instance lead to the first object always being considered not similar to the second object in the second process of compiling data, and to including the second object data into the second compiled database. For instance, the according similarity measure similarity (area 300, area 306) and similarity (area 300, area 307), respectively, may then be ∞. It may for instance depend on the use case of the second compiled database, if the difference in an attribute between a first object (area 300) and a second object (area 306 and area 307, respectively) may lead to the first object being considered not similar to the second object in the second process of compiling data. For instance, a navigation system, e.g. in a car, may use different drawing styles for objects of different types, thus objects of different types should for instance be regarded as dissimilar.

Furthermore, for instance, a navigation system, e.g. in a car, may depict names of objects, thus objects with different names should for instance be regarded as dissimilar.

Assuming the example objects of FIG. 3b-3h (areas 301-307; second objects) as objects in the second raw database and the example object of FIG. 3a (area 300, first object) as an object in the first raw database, in the second process of compiling data, the object data of area 300 may for instance rather be included than the object data of areas 301 and 302. For areas 303-305 it may for instance depend on the specific use case for the second compiled database, if the object data of the areas 303-305 or the object data of area 300 is included in the second process of compiling data. For areas 306 and 307, the object data of areas 306 and 307 may for instance rather be included in the second process of compiling data than the object data of area 300.

FIG. 4 shows a further example of objects according to example embodiments of the present invention. A first and a second object are compared and considered at least similar or not. An example is given of how to consider similarity between a first and a second object according to example embodiments of the present invention. To this end, FIG. 4 presents river 400 as first object, river 401 as second object, chain of lines 410 as geometric representation of the first object and chain of lines 411 as geometric representation of the second object. River 401 differs from river 400 in the geometry, a characteristic of the geometric representation, of the chain of lines 411 compared to the geometry of the chain of lines 410.

Considering the maximum distance 420 between chain of lines 411 and chain of lines 410 as a possible measure for the difference of the characteristics of the geometric representation, the measure may for instance be below or above a pre-defined threshold that is e.g. specific for the use case of the second compiled database. In the example of FIG. 4, the measure is different from zero. For instance, the according similarity measure similarity (river 400, river 401) may be the maximum distance (chain of lines 410, chain of lines 411), which may for instance be calculated as follows:

Define latitude and longitude values for each point (e.g. each point that is decisive for the shape) of the chains of lines 410 and 411, For each of these points of chain of lines 410:
  Obtain the minimal Euclidean distance of the point to any position of object 411 (not only to points decisive for the shape);
Determine the largest of these minimal Euclidean distances as a first intermediate result;

For each of these points of chain of lines 411:
  Obtain the minimal Euclidean distance of the point to any position of object 410 (not only to points decisive for the shape)
Determine the largest of these minimal Euclidean distances as a second intermediate result;
Among the first and second intermediate results, select the largest one as the maximum distance.

For instance, another possible measure for the difference of the characteristics of the geometric representations, in the case of lines or chains of lines that border an area, may be the (absolute or relative) difference of the sizes of the areas bordered by the lines or chains of lines.

A difference in an attribute, e.g. name or type, between river 401 and river 400 may for instance lead to the river 401 always being considered not similar to the river 400 in the second process of compiling data. In this case, for instance, the according similarity measure similarity (river 400, river 401) may be ∞.

In the second process of compiling data, if it is determined that the measure, e.g. similarity (river 400, river 401)=maximum distance (chain of lines 410, chain of lines 411), is above a pre-defined threshold, which is for instance a maximum allowed distance between the two chains of lines 410 and 411, it is considered that the first object (river 400) is not similar to the second object (river 401), and the second object data (rather than the first object data) is included into the second compiled database. If, in the second process of compiling data, it is determined that the measure is below the pre-defined threshold, it is considered that that the first object is at least similar to the second object, and the first object data (rather than the second object data) is included into the second compiled database.

Figure 5A:
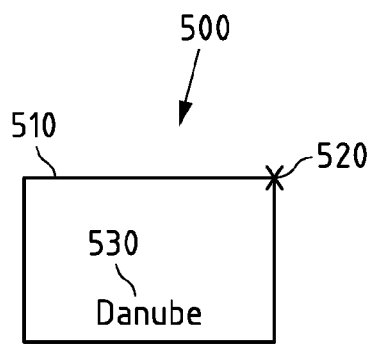
FIGS. 5a-5c examples of objects (here: labels), object data, characteristics and/or attributes thereof according to example embodiments of the present invention.
Figure 5B:
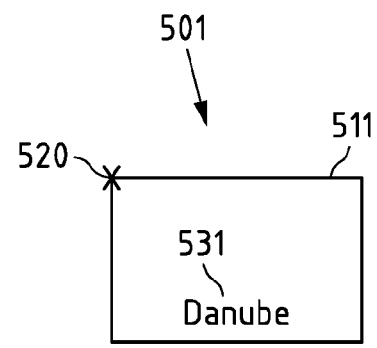
Figure 5C:
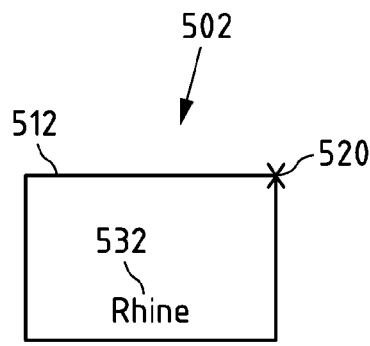

FIGS. 5a-5c show further examples of objects according to example embodiments of the present invention. In the following examples of FIGS. 5b-5c, exemplary objects (second objects) are compared to the object shown in FIG. 5a (first object) and are considered at least similar or not. Examples are given of how to consider similarity between a first and a second object according to example embodiments of the present invention. To this end, FIGS. 5a-5c present labels as objects, labelling hints as according geometric representations, the positions of the labelling hints in comparison to a reference position as characteristics of the geometric representations and names as attributes.

In FIG. 5a, the (first) object is a label 500, which is geometrically represented by a labelling hint 510. The position of the labelling hint in comparison to the reference position 520 serves as characteristic of the geometric representation, i.e. the labelling hint 510. The name 530 of the label is "Danube".

In FIG. 5b, the object is a label 501, which is geometrically represented by a labelling hint 511. The position of the labelling hint 511 in comparison to the reference position 520 serves as characteristic of the geometric representation. The name 531 of the label is "Danube". Label 501 differs from label 500 of FIG. 5a in the position of the labelling hint in comparison to the reference position 520.

Considering, in the example of FIG. 5b, the Euclidean distance between the labelling hints 511 and 510 as a possible measure for determining the difference of the characteristics of the geometric representation, the measure may for instance be below or above a pre-defined threshold that is e.g. specific for the use case of the second compiled database. In the example of FIG. 5b, the measure of the difference of the characteristics of the geometric representation is different than zero. For instance, the according similarity measure similarity (label 500, label 501) may be the Euclidean distance (labelling hint 510, labelling hint 511).

In the second process of compiling data, if it is determined that the measure, e.g. similarity (label 500, label 501)=Euclidean distance (labelling hint 510, labelling hint 511), is above a pre-defined threshold, which is for instance a maximum allowed distance between the two labelling hints 510 and 511, it is considered that the first object is not similar to the second object, and the second object data (rather than the first object data) is included into the second compiled database. If, in the second process of compiling data, it is determined that the measure is below the pre-defined threshold, it is considered that that the first object (label 500) is at least similar to the second object (label 501), and the first object data (rather than the second object data) is included into the second compiled database.

In FIG. 5c, the object is a label 502, which is geometrically represented by a labelling hint 512. The position of the labelling hint 512 in comparison to the reference position 520 serves as characteristic of the geometric representation. The name 532 of the label is "Rhine". Label 502 differs from label 500 of FIG. 5a in the name 532 of label 502 compared to name 530 of label 500. The position of the labelling hint 512 is equal to the position of labelling hint 510, as indicated by the reference position 520. As described above, a difference in the name may for instance mark a difference in an attribute, and lead to the first object always being considered not similar to the second object in the second process of compiling data, and to including the second object data into the second compiled database. For instance, the according similarity measure similarity (label 500, label 502) may be ∞. It may for instance depend on the specific use case of the second compiled database, if the difference in an attribute between a first object (label 500) and a second object (label 502) may lead to the first object being considered not similar to the second object in the second process of compiling data.

Figure 6A:
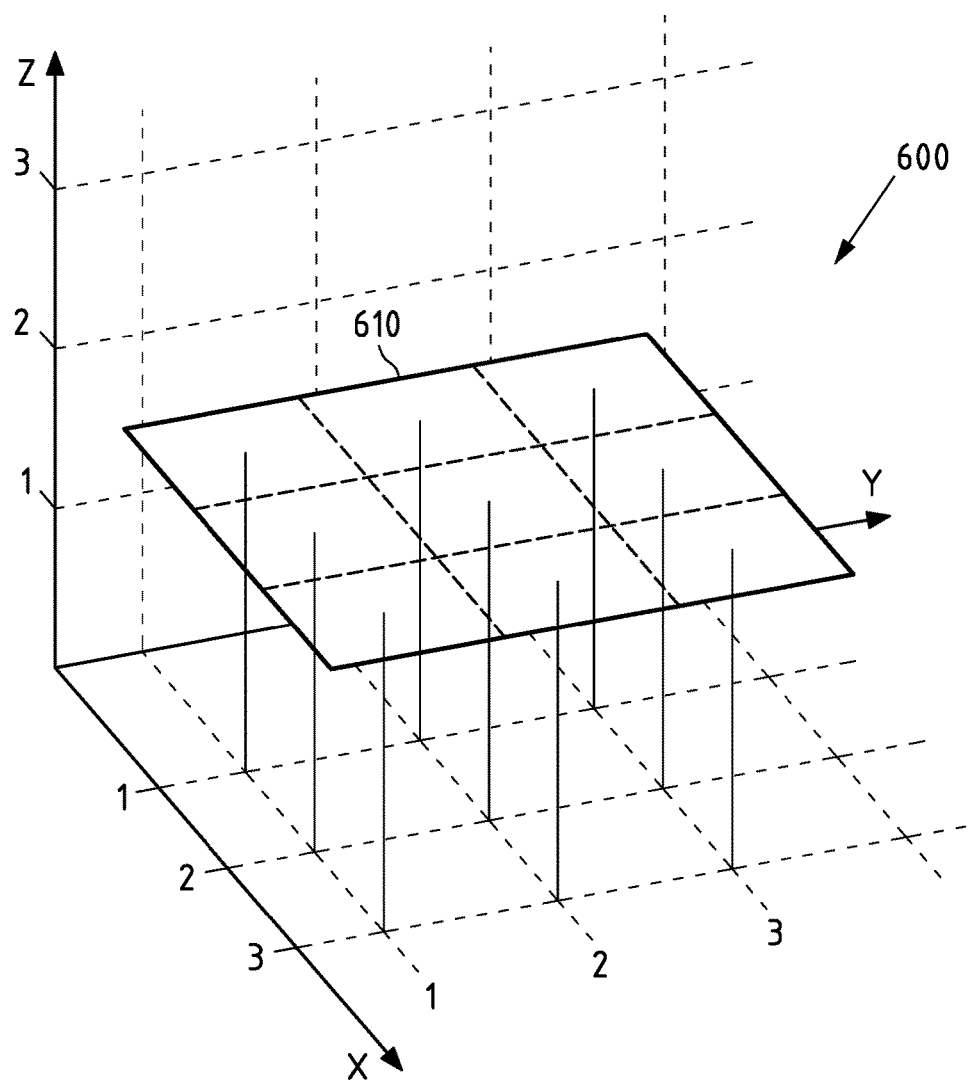
FIGS. 6a-6b examples of objects (here: 3D surfaces), object data, characteristics and/or attributes thereof according to example embodiments of the present invention.
Figure 6B:
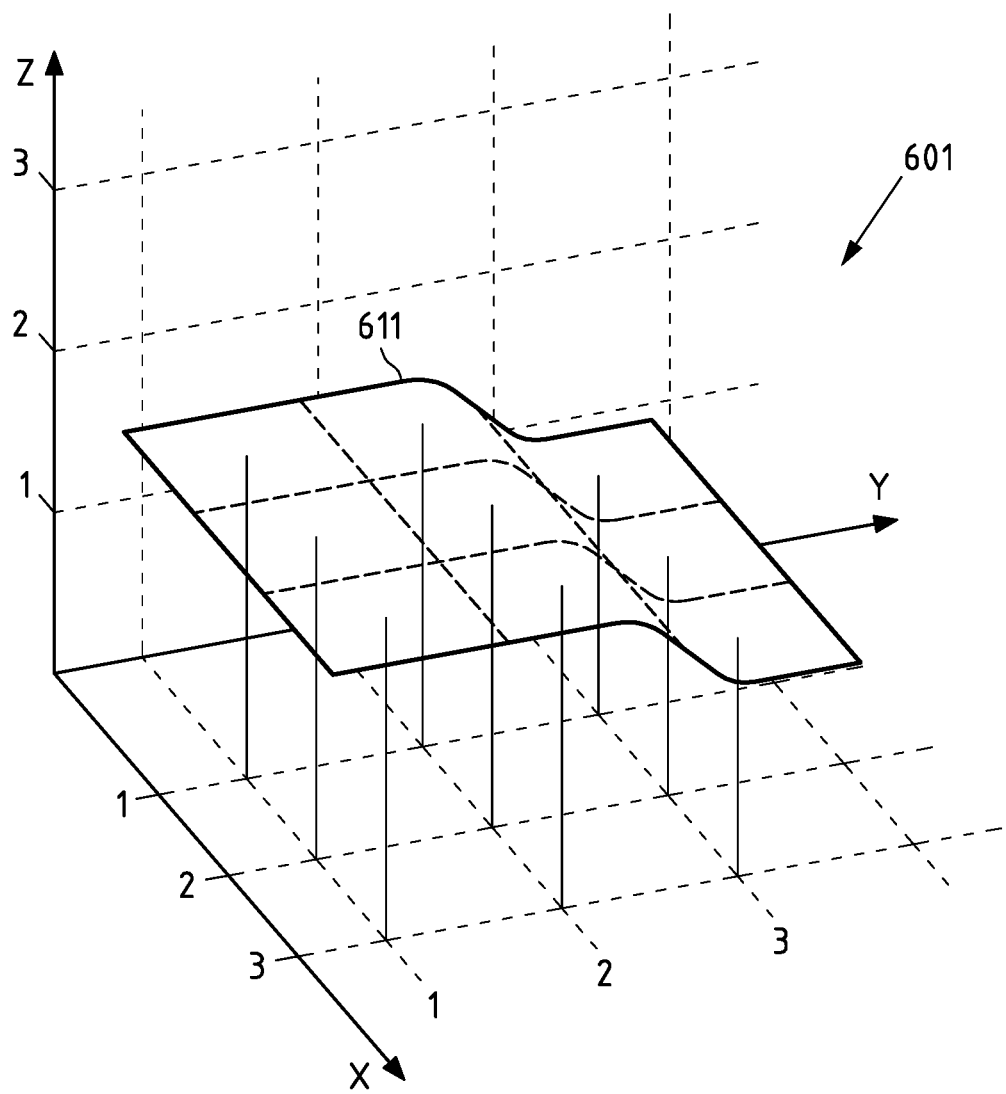

FIGS. 6a-6b show further examples of objects according to example embodiments of the present invention. In the following example of FIG. 6b, an exemplary object (second object) is compared to the object shown in FIG. 6a (first object) and is considered at least similar or not. An example is given of how to consider similarity between a first and a second object according to example embodiments of the present invention. To this end, FIGS. 6a-6b present 3D surfaces as objects, digital terrain tiles as according geometric representations and position and height value triplets as characteristics of the geometric representations.

In FIG. 6a, the object is a 3D surface 600, which is geometrically represented by a digital terrain tile 610. Position (x, y) and height (z) value triplets of the digital terrain tile serve as characteristics of the geometric representation.

In FIG. 6b, the object is a 3D surface 601, which is geometrically represented by a digital terrain tile 611. Latitude, longitude and altitude (x, y, z) value triplets of the digital terrain tile serve as characteristics of the geometric representation. In 3D surface 601, at some positions, the height values differ from the respective height values at the respective positions in 3D surface 600, thus some value triplets are different between digital terrain tile 611 and digital terrain tile 610.

Considering, in the example of FIG. 6b, a difference in any of the value triplets of the digital terrain tile 611 compared to the value triplets of the digital terrain tile 610 as a possible measure for the difference of the characteristics of the geometric representation, the measure may for instance be below or above a pre-defined threshold that is e.g. specific for the use case of the second compiled database. Accordingly, in the example of FIG. 6b the measure of the difference of the characteristics of the geometric representation is different than zero. For instance, the according similarity measure similarity (3D surface 600, 3D surface 601) may be the maximum difference between respective value triplets (digital terrain tile 610, digital terrain tile 611).

In the second process of compiling data, if it is determined that the measure, e.g. similarity (3D surface 600, 3D surface 601)=maximum difference between respective value triplets (digital terrain tile 610, digital terrain tile 611), is above a pre-defined threshold, which is for instance a maximum value allowed for differences of any value of a triplet, it is considered that the first object is not similar to the second object, and the second object data (rather than the first object data) is included into the second compiled database. The exemplarily maximum value allowed may be the equal for each value of a triplet, but may equally well be different for the values of a triplet. If, in the second process of compiling data, it is determined that the measure is below the pre-defined threshold, it is considered that that the first object (3D surface 600) is at least similar to the second object (3D surface 601), and the first object data (rather than the second object data) is included into the second compiled database.

For instance, another possible measure for the difference of the characteristics of the geometric representations may be the sum of the differences of each value of a triplet.

In further exemplary embodiments of the method of the first aspect of the invention, further possible measures for the difference of the characteristics of the geometric representation and/or attributes may for instance be defined in order to determine, if a first object is considered at least similar to a second object. Non-limiting examples of objects are 3D landmarks, satellite or junction images. For 3D landmarks, for instance, exemplary differences of characteristics would be the difference of textures and/or of the underlying triangle irregular network (TIN). For satellite or junction images, for instance, an exemplary difference of characteristics would be the number of different pixels.

Figure 7:
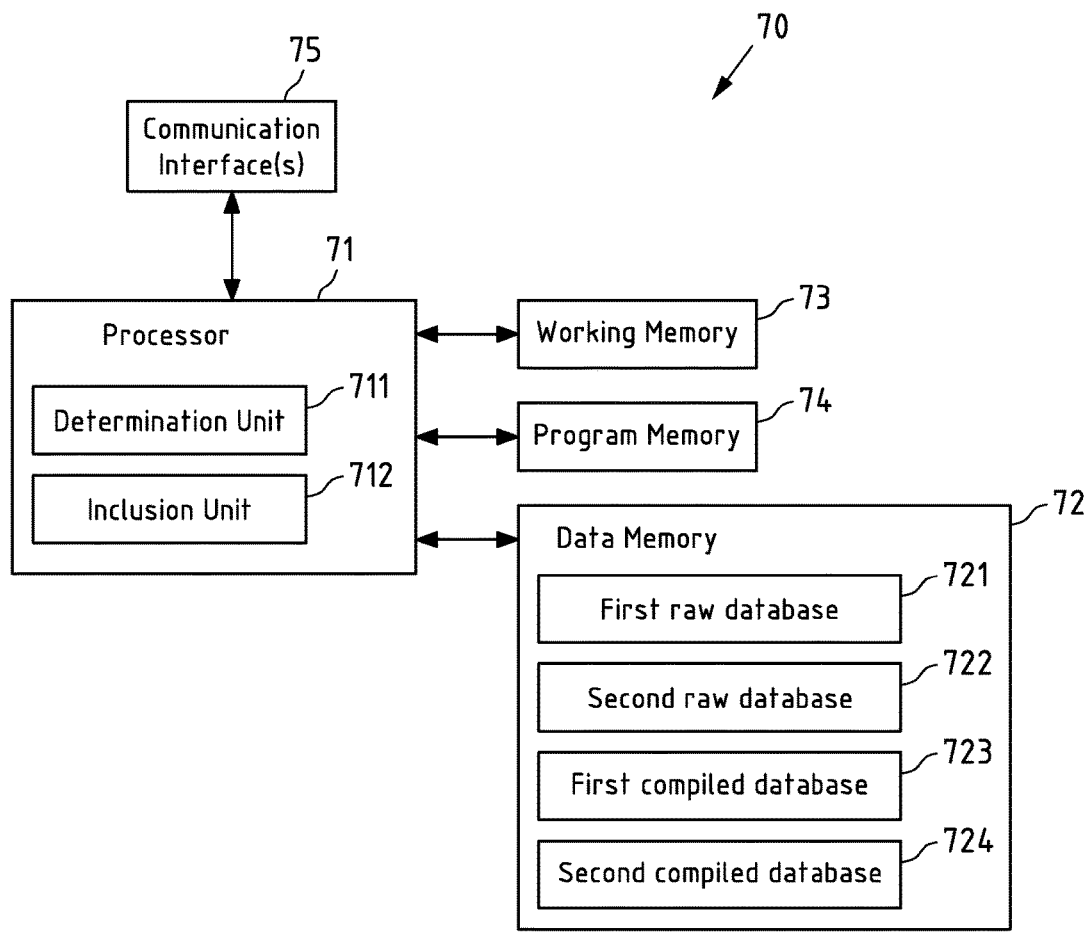
FIG. 7 a schematic block diagram of a first apparatus according to an example embodiment of the invention.

FIG. 7 is a schematic block diagram of an example embodiment of an apparatus 70 according to the invention. Apparatus 70 may for instance represent at least a part (e.g. a functional unit or module) of the server 1 (see FIG. 1).

Apparatus 70 comprises at least one processor 71 and at least one program memory 74 including computer program code, the at least one program memory 74 and the computer program code configured to, with the at least one processor 71, cause an apparatus (for instance apparatus 70, or another apparatus that comprises apparatus 70) at least to perform the method according to the first aspect of the present invention. Processor 71 for instance executes the computer program code stored in program memory 74. Processor 71 for instance accesses program memory 74 via a bus. The computer program code stored in program memory 74 is an example of a computer program code according to the respective aspect of the present invention, i.e. a computer program code that when executed by processor 71 causes apparatus 70 (or an apparatus that comprises apparatus 70) to perform the actions of the method according to the first aspect of the invention.

Apparatus 70 is also an example embodiment of an apparatus that is configured to perform or comprises components for performing the method according to the first aspect of the present invention. The processor 71 of apparatus 70 comprises a determination unit 711 and/or an inclusion unit 712. The determination unit 711 may for instance be configured to perform determining, in a process of compiling data that yields a second compiled database, whether a first compiled database, which is yield from a first process of compiling data performed before the second process of compiling data, contains first object data defining a first object that is considered at least similar to a second object. The inclusion unit 712 may for instance be configured to perform including, in the second process of compiling data, second object data defining the second object into the second compiled database, if it is determined that first object data defining a first object that is considered at least similar to the second object is not contained in the first compiled database, and to perform including the first object data defining the first object into the second compiled database otherwise. Determination unit 711 and/or inclusion unit 712 may be separate components (e.g. sub-processors or cores) of processor 71 or may be combined in a single component of processor 71.

Program memory 74 may also be included into processor 71. This memory may for instance be fixedly connected to processor 71, or be at least partially removable from processor 71, for instance in the form of a memory card or stick. Program memory 74 may also comprise an operating system for processor 71. Program memory 74 may also comprise a firmware for apparatus 70. Program memory 74 may for instance comprise a first memory portion that is fixedly installed in apparatus 70, and a second memory portion that is removable from apparatus 70, for instance in the form of a removable SD memory card.

Apparatus 70 further comprises data memory 72. Processor 71 for instance accesses data memory 72 via a bus. Data memory 72 may also be included into processor 71. Data memory 72 may for instance be fixedly connected to processor 71, or be at least partially removable from processor 71, for instance in the form of a memory card or stick. Data memory 72 comprises databases, for instance the first raw database 721, the second raw database 722. Data memory may for instance further comprise the second compiled database 724, and, in exemplary embodiments of the invention, also the first compiled database 723. Data memory 72 may for instance comprise a first memory portion that is fixedly installed in apparatus 70, and a second memory portion that is removable from apparatus 70, for instance in the form of a removable SD memory card.

Program memory 74 and/or data memory 72 may for instance be non-volatile memory. It may for instance be a FLASH memory (or a part thereof), any of a ROM, Programmable ROM (PROM), Erasable PROM (EPROM), Electrically Erasable PROM (EEPROM), Magnetoresistive Random Access Memory (MRAM) or a Ferroelectric Random Access Memory (FeRAM) memory (or a part thereof) or a hard disc (or a part thereof), to name but a few examples.

In the apparatus 70, processor 71 interfaces with a working memory 73, for instance in the form of a volatile memory. It may for instance be a Random Access Memory (RAM) or Dynamic RAM (DRAM), to give but a few non-limiting examples. It may for instance be used by processor 71 when executing an operating system and/or computer program code.

Processor 71 further controls a communication interface 75 configured to receive and/or output data and/or information. For instance, communication interface 75 may be configured to communicate with one or more remote devices, e.g. with device 2 (see FIG. 1). This may for instance comprise receiving information such as requests (e.g. update requests) from remote devices and/or transmitting information such as data (e.g. data that allows updating a first compiled database to a second compiled database) to the remote devices. The communication may for instance at least partially (or entirely) be based on a wireless communication connection. The communication interface 75 may thus comprise circuitry such as modulators, filters, mixers, switches and/or one or more antennas to allow transmission and/or reception of signals, e.g. for the communication with the remote devices. In embodiments of the invention, communication interface 75 is inter alia configured to allow communication according to a 2G/3G/4G/5G cellular communication system and/or a non-cellular communication system, such as for instance a WLAN network. Nevertheless, the communication connection between apparatus 70 and the remote devices may equally well at least partially comprise wire-bound portions. For instance, apparatus 70 may be connected to a back-bone of a wireless communication system (associated with the remote devices) via a wire-bound system such as for instance the Internet.

Processor 71 (and also any other processor mentioned in this specification) may be a processor of any suitable type. Processor 71 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 71 may for instance be an application processor that runs an operating system.

Some or all of the components of the apparatus 70 may for instance be connected via a bus. Some or all of the components of the apparatus 70 may for instance be combined into one or more modules.

Figure 8:
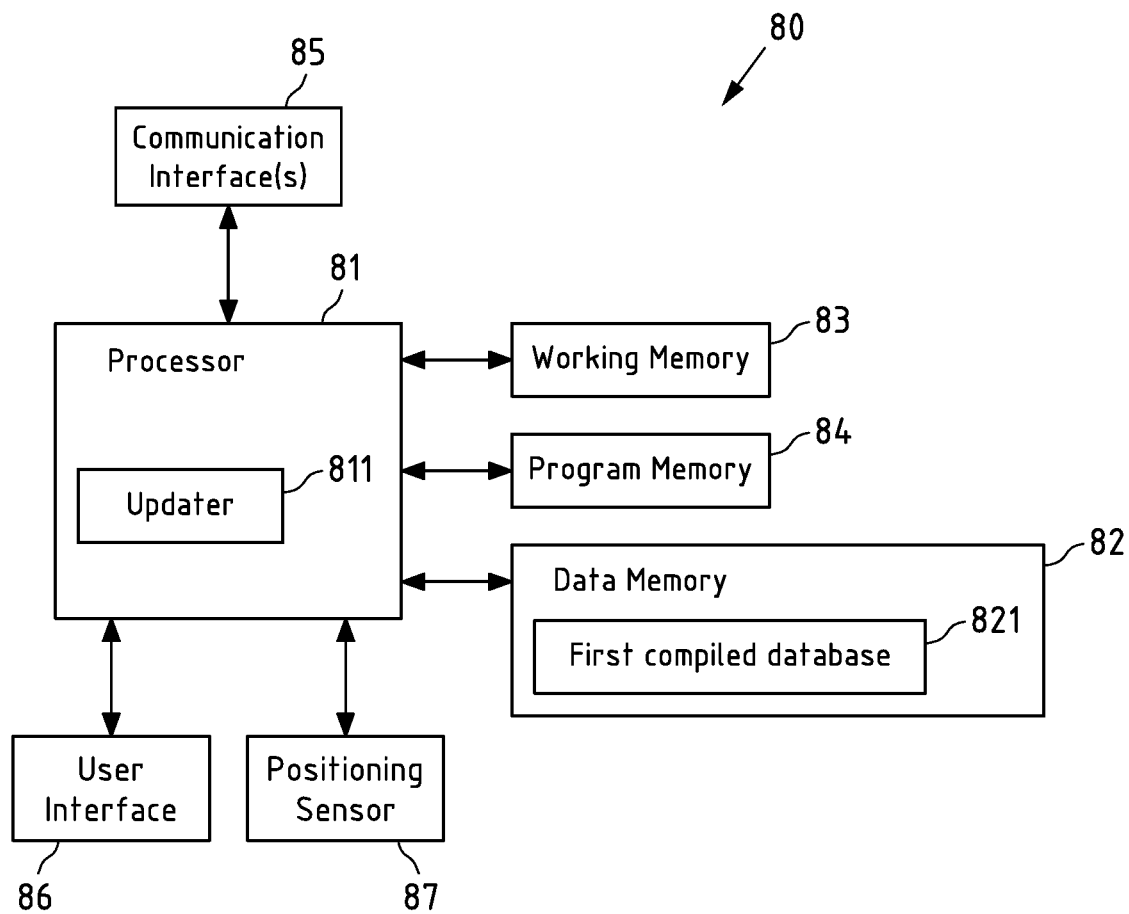
FIG. 8 a schematic block diagram of a second apparatus deployed in an example embodiment of a system according to the invention.

FIG. 8 is a schematic block diagram of an example embodiment of an apparatus 80, which is an apparatus deployed in an embodiment of a system according to the invention. Apparatus 80 may for instance represent at least a part (e.g. a functional unit or module) of the device 2 (see FIG. 1). Apparatus 80 comprises at least one processor 81 and at least one program memory 84. Processor 81 comprises an updater 811, which may for instance be configured to update a first compiled database 821 to a second compiled database, for instance by executing a computer program code stored in program memory 84. Program memory 84 may for instance be a non-volatile memory. Processor 81 interfaces with working memory 83, which may for instance be used as a working memory for processor 81. Working memory 83 may for instance be a volatile memory. Processor 81 interfaces with data memory 82, on which for instance a first compiled database may be stored. On data memory 84, further databases, e.g. a second compiled database, may be stored additionally or alternatively. Data memory 84 may for instance be a non-volatile memory. Data memory 84 may for instance comprise a first memory portion that is fixedly installed in apparatus 80 and/or a second memory portion that is removable from apparatus 80, for instance in the form of a removable SD memory card. Processor 81 controls a communication interface 85 configured to receive and/or output data and/or information. For instance, communication interface 85 may be configured to communicate with the apparatus 70 as described above. Via communication interface 85, apparatus 80 may receive data, e.g. data allowing updating a first compiled database to a second compiled database. Processor 81 controls a user interface 86, which may for instance be configured for interaction with a user of apparatus 80. User interface 86 may for instance comprise a display, a keyboard and/or a touch-sensitive surface. Processor 81 interfaces with positioning sensor 87, which may for instance determine the position of apparatus 80. Positioning sensor 87 may for instance comprise a Global Positioning System (GPS) receiver and/or a Global Navigation Satellite System (GLONASS) receiver.

Figure 9:
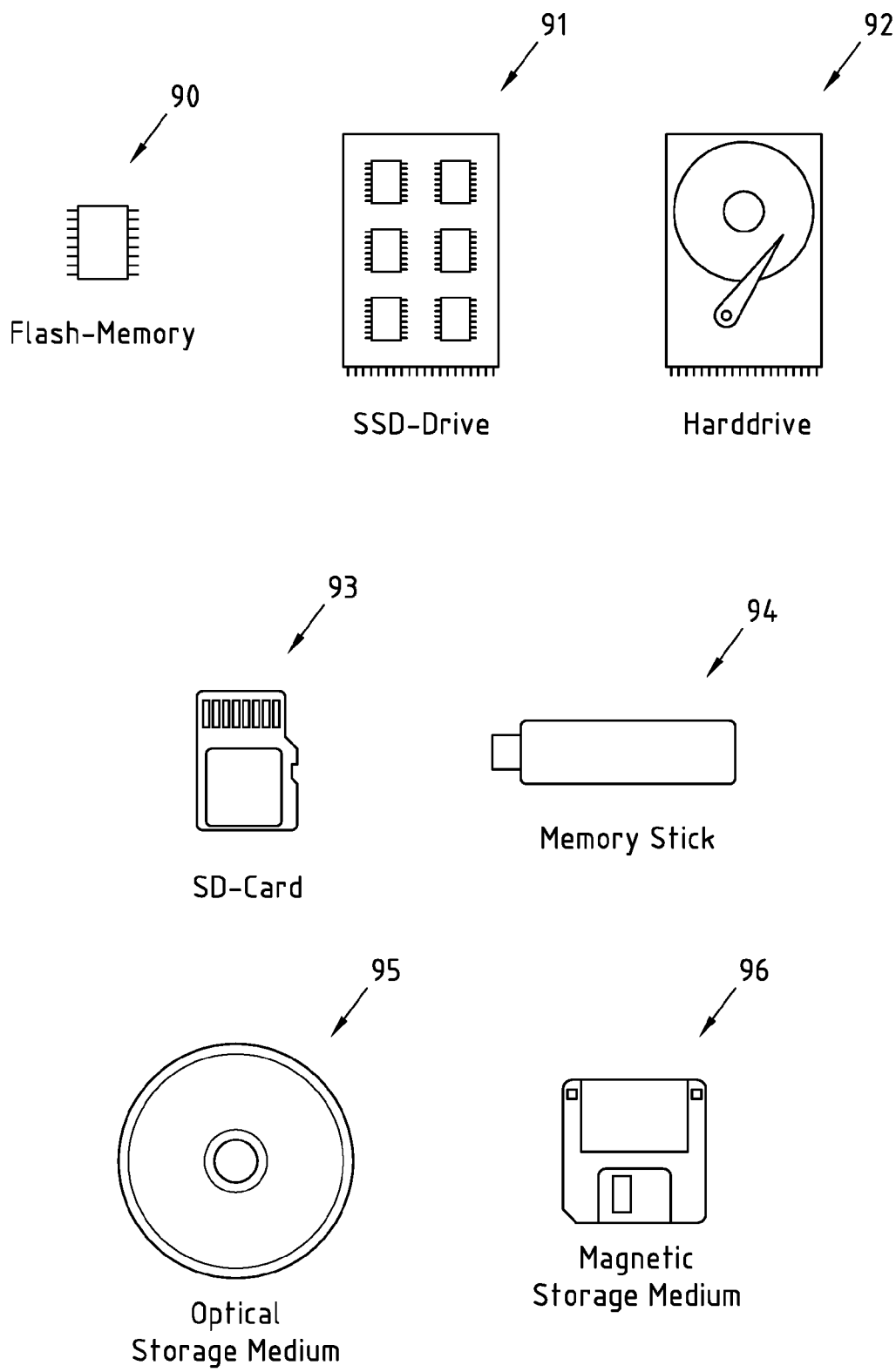
FIG. 9 a schematic illustration of examples of tangible and non-transitory storage media according to the present invention.

FIG. 9 is a schematic illustration of examples of tangible computer-readable storage media according to the present invention that may for instance be used to implement program memory 74, and/or data memory 72 of FIG. 7 and/or program memory 84 and/or data memory 82 of FIG.

8. To this end, FIG. 9 displays a flash memory 90, which may for instance be soldered or bonded to a printed circuit board, a solid-state drive 91 comprising a plurality of memory chips (e.g. Flash memory chips), a magnetic hard drive 92, a Secure Digital (SD) card 93, a Universal Serial Bus (USB) memory stick 94, an optical storage medium 95 (such as for instance a CD-ROM or DVD) and a magnetic storage medium 96.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program code) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The following embodiments of the invention shall also be considered to be disclosed:

Embodiment 1

A method comprising:
determining, in a second process of compiling data that yields a second compiled database, whether a first compiled database, which is yield from a first process of compiling data performed before the second process of compiling data, contains first object data defining a first object that is considered at least similar to a second object; and
including, in the second process of compiling data, second object data defining the second object into the second compiled database, if it is determined that first object data defining a first object that is considered at least similar to the second object is not contained in the first compiled database, and including the first object data defining the first object into the second compiled database otherwise.

Embodiment 2

The method according to embodiment 1, wherein the first compiled database and the second compiled database serve as inputs to a process of generating data that allows updating the first compiled database to the second compiled database.

Embodiment 3

The method according to one of embodiments 1-2, wherein said determining is based on a set of one or more rules respectively defining in which case an object is to be considered at least similar to another object or not.

Embodiment 4

The method according to embodiment 3, wherein a rule of the set of rules defines that an object is to be considered at least similar to another object if a similarity measure that expresses a similarity between the object and the other object is in a pre-defined relation to a pre-defined threshold.

Embodiment 5

The method according to embodiment 4, wherein the pre-defined threshold depends on an application for which a database corresponding to the second compiled database is intended.

Embodiment 6

The method according to one of embodiments 4-5, wherein the similarity measure depends on a difference between the object and the other object with respect to at least one characteristic of respective geometric representations of the object and the other object or with respect to the respective geometric representations themselves, and/or a difference between the object and the other object with respect to at least one attribute of the object and the other object.

Embodiment 7

The method according to embodiment 6, wherein the at least one characteristic comprises position, shape, order of shape-determining elements, number of shape-determining elements, scale and/or orientation.

Embodiment 8

The method according to embodiment 7, wherein the similarity measure of two objects that differ only in the order and/or the number of shape-determining elements of their respective geometric representations equals the similarity measure of two objects that do not differ in this respect, and/or wherein the similarity measure of two objects that differ with respect to a position, shape, scale and/or orientation differs from the similarity measure of two objects that do not differ in this respect.

Embodiment 9

The method according to one of embodiments 6-8, wherein the at least one attribute does not pertain to a position, shape, order of shape-determining elements, number of shape-determining elements, scale and orientation of the respective geometric representations of the objects.

Embodiment 10

The method according to one of embodiments 6-9, wherein the at least one attribute comprises a type and/or a name.

Embodiment 11

The method according to one of embodiments 6-10, wherein the similarity measure is set to a pre-defined value if there exists a difference between the object and the other object with respect to at least one attribute of a set of one or more pre-defined attributes, and wherein the similarity measure is represented by a difference between the object and the other object with respect to at least one characteristic of respective geometric representations of the object and the other object, if there exists no difference between the object and the other object with respect to all attributes of the set of pre-defined attributes.

Embodiment 12

The method according to one of embodiments 3-11, wherein a rule of the set of rules defines that an object is to be considered at least similar to another object, although the object and the other object differ in at least one aspect of their respective geometric representations, in particular in an order and/or a number of shape-determining points, if at least a position, shape, scale and orientation of their respective geometric representations match.

Embodiment 13

The method according to one of embodiments 3-12, wherein a rule of the set of rules defines that an object is to be considered at least similar to another object although the object and the other object differ in at least one aspect of their respective geometric representations, if a measure for the difference between these geometric representations is below a pre-defined threshold.

Embodiment 14

The method according to one of embodiments 3-13, wherein a rule of the set of rules defines that an object is not to be considered at least similar to another object if a geometric representation of the object differs from a geometric representation of the other object by scaling, rotation and/or translation.

Embodiment 15

The method according to one of embodiments 3-14, wherein a rule of the set of rules defines that an object is not to be considered at least similar to another object if the object and the other object differ with respect to at least one pre-defined attribute, in particular a type or name.

Embodiment 16

The method according to one of embodiments 3-15, wherein a rule of the set of rules defines that an object is not to be considered at least similar to another object although their respective geometric representations or at least a position, shape, scale and orientation of their respective geometric representations match, if the object and the other object differ at least with respect to at least one pre-defined attribute.

Embodiment 17

A computer program code, the computer program code when executed by a processor causing an apparatus to perform and/or control the actions of the method of one of the embodiments 1-16.

Embodiment 18

An apparatus configured to perform and/or control or comprising respective means for performing and/or controlling the method of one of the embodiments 1-16.

Embodiment 19

An apparatus, comprising at least one processor and at least one memory including computer program code, the at least one memory and the computer program code configured to, with the at least one processor, cause an apparatus at least to perform and/or control the method according to one of the embodiments 1-16.

Embodiment 20

A system, comprising:
a first apparatus according to one of embodiments 18-19,
a second apparatus that comprises the first compiled database and is configured to update, based on data that is generated by a process based on the first compiled database and the second compiled database and allows updating the first compiled database to the second compiled database, the first compiled database to the second compiled database.

The invention claimed is:
1. An apparatus, comprising at least one processor and at least one memory including computer program code, the at least one memory and the computer program code configured to, with the at least one processor, cause the apparatus at least to perform:
determining, in a second process of compiling data that yields a second compiled database, whether a first compiled database, which is yield from a first process of compiling data performed before the second process of compiling data, contains first object data defining a first object that is considered at least similar to a second object;

responsive to determining that first object data defining a first object that is considered to be at least similar to a second object defined by second object data is not contained in the first compiled database, including, in the second process of compiling data, the second object data defining the second object into the second compiled database;

responsive to determining that the first object data defining the first object that is considered to be at least similar to the second object defined by the second object data is contained in the first compiled database, including the first object data defining the first object into the second compiled database;

based on the second process, generating an update data package comprising update data configured for updating the first compiled database to the second compiled database; and providing the update data package such that the update data package is received by a second apparatus, wherein the second apparatus is configured to use the update data of the update data package to update a local first compiled database stored in a memory of the second apparatus to a local second compiled database stored in the memory of the second apparatus and use the local second compiled database to perform one or more navigation functions.

2. The apparatus according to claim 1, wherein the first compiled database and the second compiled database serve as inputs to a process of generating the update data for updating the first compiled database to the second compiled database.

3. The apparatus according to claim 1, wherein said determining is based on a set of one or more rules respectively defining in which case an object is to be considered at least similar to another object or not.

4. The apparatus according to claim 3, wherein a rule of the set of rules defines that an object is to be considered at least similar to another object if a similarity measure that expresses a similarity between the object and the other object is in a pre-defined relation to a pre-defined threshold.

5. The apparatus according to claim 4, wherein the pre-defined threshold depends on an application for which a database corresponding to the second compiled database is intended.

6. The apparatus according to claim 4, wherein the similarity measure depends on a difference between the object and the other object with respect to at least one characteristic of respective geometric representations of the object and the other object or with respect to the respective geometric representations themselves, and/or a difference between the object and the other object with respect to at least one attribute of the object and the other object.

7. The apparatus according to claim 6, wherein the at least one characteristic comprises at least one of position, shape, order of shape-determining elements, number of shape-determining elements, scale, or orientation.

8. The apparatus according to claim 7, wherein the similarity measure of two objects that differ only in the order and/or the number of shape-determining elements of their respective geometric representations equals the similarity measure of two objects that do not differ in this respect, and/or wherein the similarity measure of two objects that differ with respect to a position, shape, scale and/or orientation differs from the similarity measure of two objects that do not differ in this respect.

9. The apparatus according to claim 6, wherein the at least one attribute does not pertain to a position, shape, order of shape-determining elements, number of shape-determining elements, scale and orientation of the respective geometric representations of the objects.

10. The apparatus according to claim 6, wherein the at least one attribute comprises a type and/or a name.

11. The apparatus according to claim 6, wherein the similarity measure is set to a pre-defined value if there exists a difference between the object and the other object with respect to at least one attribute of a set of one or more pre-defined attributes, and wherein the similarity measure is represented by a difference between the object and the other object with respect to at least one characteristic of respective geometric representations of the object and the other object, if there exists no difference between the object and the other object with respect to all attributes of the set of pre-defined attributes.

12. The apparatus according to claim 3, wherein a rule of the set of rules defines that an object is to be considered at least similar to another object, although the object and the other object differ in at least one aspect of their respective geometric representations, in particular in an order and/or a number of shape-determining points, if at least a position, shape, scale and orientation of their respective geometric representations match.

13. The apparatus according to claim 3, wherein a rule of the set of rules defines that an object is to be considered at least similar to another object although the object and the other object differ in at least one aspect of their respective geometric representations, if a measure for the difference between these geometric representations is below a pre-defined threshold.

14. The apparatus according to claim 3, wherein a rule of the set of rules defines that an object is not to be considered at least similar to another object if a geometric representation of the object differs from a geometric representation of the other object by scaling, rotation and/or translation.

15. The apparatus according to claim 3, wherein a rule of the set of rules defines that an object is not to be considered at least similar to another object if the object and the other object differ with respect to at least one pre-defined attribute, in particular a type or name.

16. The apparatus according to claim 3, wherein a rule of the set of rules defines that an object is not to be considered at least similar to another object although their respective geometric representations or at least a position, shape, scale and orientation of their respective geometric representations match, if the object and the other object differ at least with respect to at least one pre-defined attribute.

17. A method comprising:
determining, in a second process of compiling data that yields a second compiled database, whether a first compiled database, which is yield from a first process of compiling data performed before the second process of compiling data, contains first object data defining a first object that is considered at least similar to a second object;

responsive to determining that first object data defining a first object that is considered to be at least similar to a second object defined by second object data is not contained in the first compiled database, including, in the second process of compiling data, second object data defining the second object into the second compiled database;

responsive to determining that the first object data defining the first object that is considered to be at least similar to the second object defined by the second object data is contained in the first compiled database, including the first object data defining the first object into the second compiled database;

based on the second process, generating an update data package comprising update data configured for updating the first compiled database to the second compiled database; and providing the update data package such that the update data package is received by a second apparatus, wherein the second apparatus is configured to use the update data of the update data package to update a local first compiled database stored in a memory of the second apparatus to a local second compiled database stored in the memory of the second apparatus and use the local second compiled database to perform one or more navigation functions.

18. A tangible and non-transitory computer-readable storage medium comprising computer program code, the computer program code when executed by a processor causing an apparatus to perform and/or control:

determining, in a second process of compiling data that yields a second compiled database, whether a first compiled database, which is yield from a first process of compiling data performed before the second process of compiling data, contains first object data defining a first object that is considered at least similar to a second object;

responsive to determining that first object data defining a first object that is considered to be at least similar to a second object defined by second object data is not contained in the first compiled database, including, in the second process of compiling data, second object data defining the second object into the second compiled database;

responsive to determining that the first object data defining the first object that is considered to be at least similar to the second object defined by the second object data is contained in the first compiled database, including the first object data defining the first object into the second compiled database;

based on the second process, generating an update data package comprising update data configured for updating the first compiled database to the second compiled database; and providing the update data package such that the update data package is received by a second apparatus, wherein the second apparatus is configured to use the update data of the update data package to update a local first compiled database stored in a memory of the second apparatus to a local second compiled database stored in the memory of the second apparatus and use the local second compiled database to perform one or more navigation functions.

19. A system, comprising:

a first apparatus, the first apparatus comprising at least one processor and at least one memory including computer program code, the at least one memory and the computer program code configured to, with the at least one processor, cause the apparatus at least to perform:

determining, in a second process of compiling data that yields a second compiled database, whether a first compiled database, which is yield from a first process of compiling data performed before the second process of compiling data, contains first object data defining a first object that is considered at least similar to a second object;

responsive to determining that first object data defining a first object that is considered to be at least similar to a second object defined by second object data is not contained in the first compiled database, including, in the second process of compiling data, the second object data defining the second object into the second compiled database;

responsive to determining that the first object data defining the first object that is considered to be at least similar to the second object defined by the second object data is contained in the first compiled database, including the first object data defining the first object into the second compiled database;

based on the second process, generating an update data package comprising update data configured for updating the first compiled database to the second compiled database; and providing the update data package such that the update data package is received by a second apparatus, and the second apparatus that comprises a local first compiled database (a) stored in a memory thereof and (b) corresponding to the first compiled database, and the second apparatus is configured to:

receive the update data package, update the local first compiled database to a local second compiled database corresponding to the second compiled database using the update data,-and use the local second compiled database to perform one or more navigation functions.

* * * * *